United States Patent
Janik et al.

[11] Patent Number: 5,868,931
[45] Date of Patent: Feb. 9, 1999

[54] PRIMER SYSTEM FOR FILTER ASSEMBLY

[75] Inventors: Leon P. Janik, Suffield; Michael J. Williams, Glastonbury, both of Conn.

[73] Assignee: Stanadyne Automotive Corp., Windsor, Conn.

[21] Appl. No.: 974,773

[22] Filed: Nov. 20, 1997

[51] Int. Cl.[6] .......................... B01D 35/01; B01D 35/26
[52] U.S. Cl. ............... 210/416.4; 210/117; 210/136; 210/436; 210/416.1
[58] Field of Search .................... 210/117, 136, 210/196, 416.4, 436, 167, 541, 416.1

[56] References Cited

U.S. PATENT DOCUMENTS

| | | |
|---|---|---|
| 3,389,801 | 6/1968 | Sieger . |
| 4,437,986 | 3/1984 | Hutchins . |
| 4,470,301 | 9/1984 | Hutchins . |
| 4,500,425 | 2/1985 | Thornton . |
| 4,515,690 | 5/1985 | Yasuhara . |
| 4,539,108 | 9/1985 | Izutani . |
| 4,956,081 | 9/1990 | Hodgkins . |
| 5,207,898 | 5/1993 | Hodgkins . |
| 5,362,392 | 11/1994 | Jensen . |
| 5,578,221 | 11/1996 | Janik . |
| 5,643,446 | 7/1997 | Clausen . |

*Primary Examiner*—Thomas M. Lithgow
*Attorney, Agent, or Firm*—Alix, Yale & Ristas, LLP

[57] ABSTRACT

A fuel filter assembly employs a hand primer and a disposable filter cartridge mounted to a filter base. The filter cartridge and filter base define a fuel flow path through the filter assembly. The filter base includes a sump for receiving fuel that has traversed the filter element. The hand primer includes a deformable member composed of an elastomeric material that cooperates with a base plate to define a cavity. The base plate is disposed intermediate the deformable member and the base sump to separate the cavity from the fuel flow path. The base plate has a plurality of orifices to selectively provide fluid communication between the cavity and the sump. A discharge passage in fluid communication with cavity provides means for discharging air from the fuel filter assembly.

14 Claims, 4 Drawing Sheets

PRIMER SYSTEM FOR FILTER ASSEMBLY

BACKGROUND OF THE INVENTION

The present invention generally relates to enhancements in devices for filtering and separating liquids. More particularly, the present invention relates to fuel filters for removing foreign particles and separating water from fuel of a fuel supply system associated with an internal combustion engine.

Diesel fuel supplies frequently contain significant quantities of abrasive particles and water which present the potential for permanent damage to the components of the fuel injection pump and the fuel delivery system of the engine. Consequently, an effective fuel filter assembly is a practical necessity and is conventionally incorporated into the fuel supply system of a diesel engine. A multitude of conventional fuel filter assemblies employ a disposable filter cartridge which is replaced at pre-established intervals of filter usage. Such filter cartridges typically perform the dual function of removing particulate material from the diesel fuel and separating water from the fuel.

The fuel filter assemblies to which the present invention relates include a replaceable filter cartridge and a header with a base which accepts the disposable filter cartridge. The filter cartridge has a housing which defines an axial opening at one end thereof to provide fuel communication between the fuel delivery system and a filter element disposed within the cartridge housing. A sealing grommet is disposed at the axial opening to provide a fluid-tight seal. The fuel filter cartridges may house a single stage filter or a dual stage filter and may assume a wide variety of shapes and configurations.

In conventional fuel filter assemblies to which the invention relates, a manual primer mechanism is often provided to facilitate engine starting after a spent fuel cartridge has been replaced with a fresh one. In particular, this fuel primer mechanism is disposed in the fuel flow path between the fuel entry port and the central fuel conduit such that actuation of the manual primer pump draws fuel from the connected fuel supply and forces it through the filter cartridge and into the fuel injection pump. While such designs can effectively prime the filter cartridge, they suffer from the deficiency that the pressure pulses generated by the primer mechanism push the air which is trapped in the fuel filter assembly into the fuel supply system. This air is carried by the fuel to the fuel injection pump where it interferes with the proper operation of the fuel injection pump and may have a deleterious effect on emissions.

Conventional fuel filter assemblies have employed a number of approaches to reduce or eliminate the pressure pulse associated with operation of the primer mechanism. One conventional primer pump system employs a manually operated valve. However, such prior approaches have generally reduced the effectiveness of the hand primer mechanism in removing the trapped air. Accordingly, there is a need in the art for improved fuel filter assemblies and methods therefor in which the fuel filter assembly may be primed without transporting a portion of the air contained therein to the fuel injection pump.

SUMMARY OF THE INVENTION

Briefly stated, the invention is an improved hand primer for use with a conventional fuel filter assembly wherein the fuel filter base and the fuel filter cartridge define the fuel flow path through the filter assembly. The fuel filter base includes a sump for receiving filtered fuel that has traversed the filter element. The hand primer includes a deformable member composed of an elastomeric material that cooperates with a base plate to define a cavity. The base plate is disposed intermediate the deformable member and the base sump to separate the cavity from the fuel flow path. The base plate has a plurality of orifices to selectively provide fluid communication between the cavity and the sump. A discharge passage in fluid communication with the cavity provides means for discharging air from the fuel filter assembly.

The hand primer also includes first and second check valves that are moveable between open and closed positions to selectively prevent flow through the orifices and the discharge passage, respectively. A spring engages the deformable member and the base plate to bias the deformable member away from the base plate.

The filter assembly is primed by pushing the deformable member downwardly, compressing the spring and creating a high pressure within the cavity. The high pressure moves the first check valve to the closed position and the second check valve to the open position, causing trapped air to be expelled through the discharge passage. Removing the downward force allows the spring to return to its normal length, forcing the deformable member upwardly thereby creating a low pressure. The low pressure moves the first check valve to the open position and the second check valve to the closed position, causing the suction force of the low pressure to draw trapped air out of the sump. The suction force generated by the fuel injection pump is greater than the suction force generated by the hand primer, preventing reverse flow into the fuel filter assembly.

The separate flow path configuration of the hand primer prevents the pressure pulse generated by the hand primer from forcing air into the fuel supply to the fuel injection pump. Therefore, the hand primer protects the fuel injection pump.

It is accordingly an object of the present invention to provide an improved hand primer for use with fuel filter assemblies in which the hand primer is effectively isolated from the fuel flow path through the filter assembly.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DESCRIPTION OF THE PREFERRED EMBODIMENTS

Figure 1:
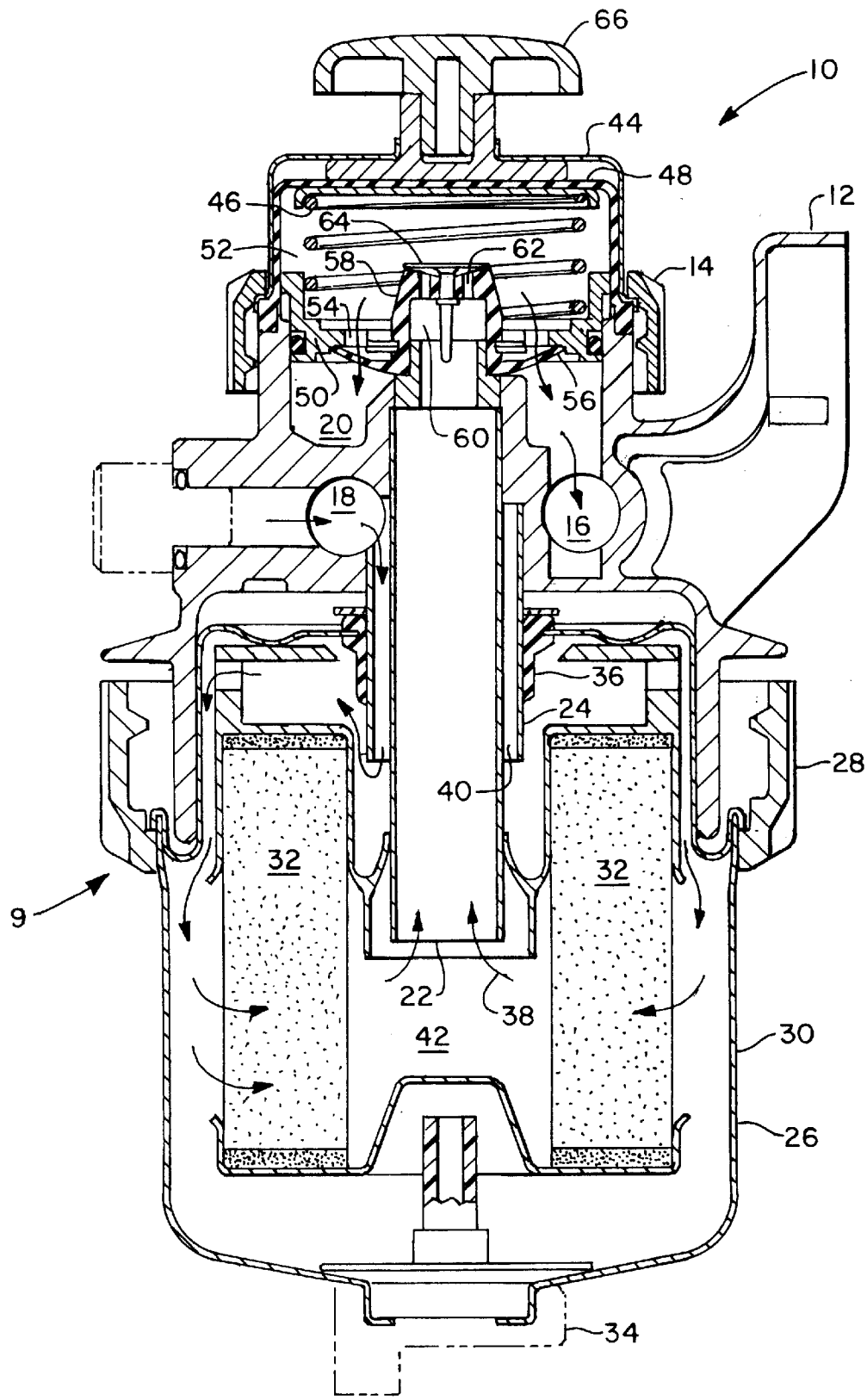
FIG. 1 is a sectional elevation view of a prior art fuel filter assembly.
Figure 2:
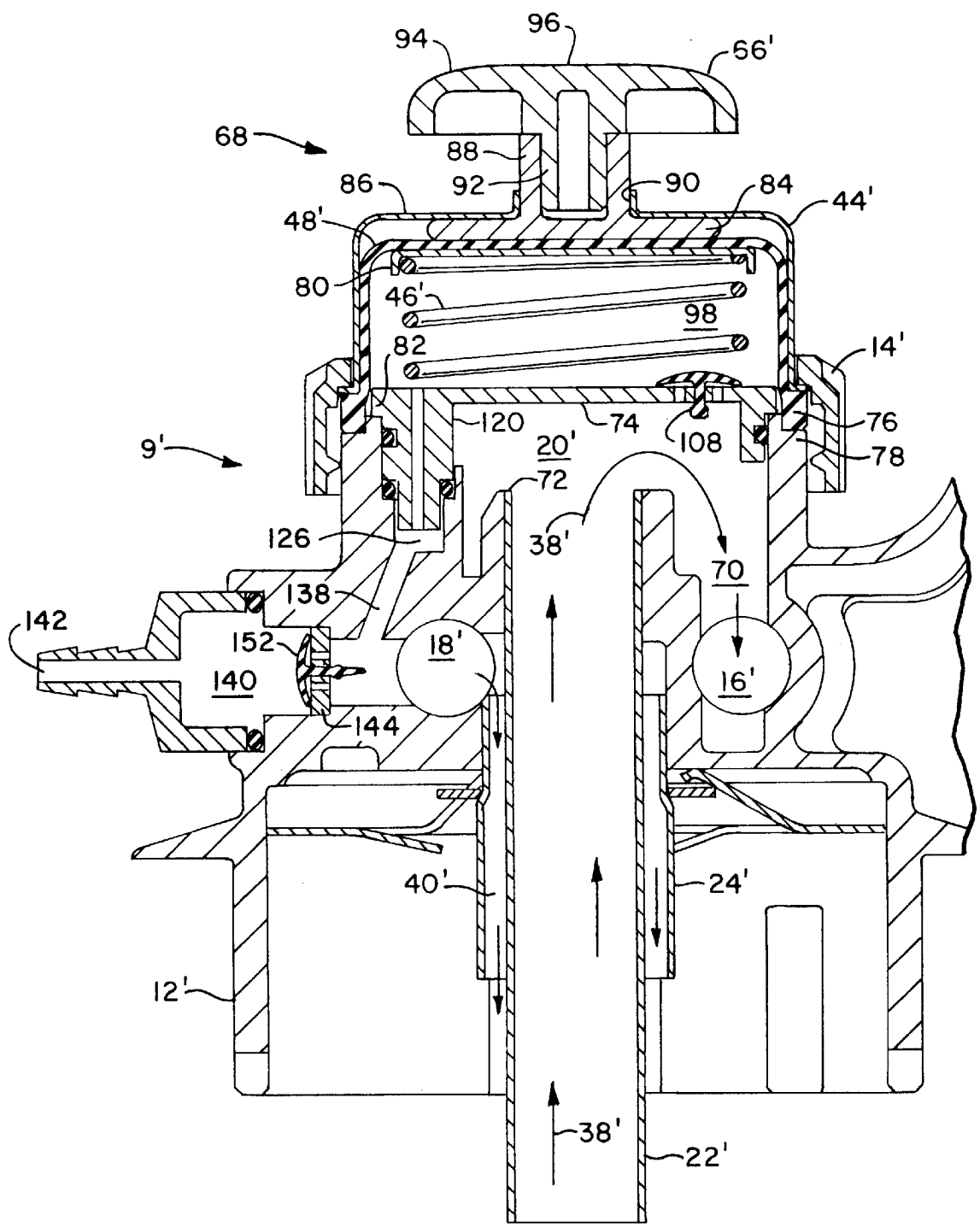
FIG. 2 is an enlarged sectional elevation view of a first embodiment of a hand primer and filter base of a fuel filter assembly in accordance with the invention.
Figure 3:
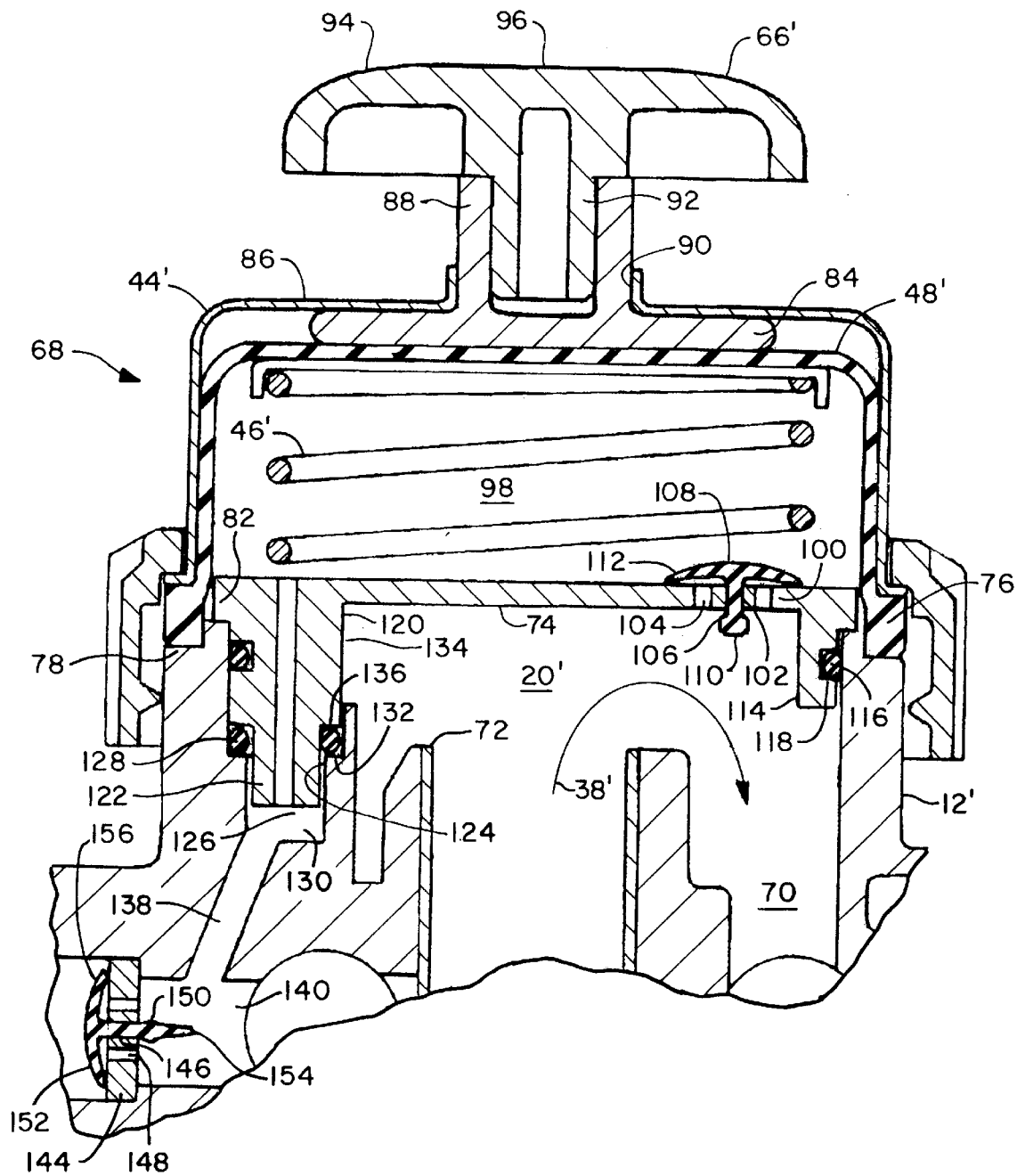
FIG. 3 is an enlarged sectional elevation view of the hand primer and a portion of the filter base of FIG. 2.
Figure 4:
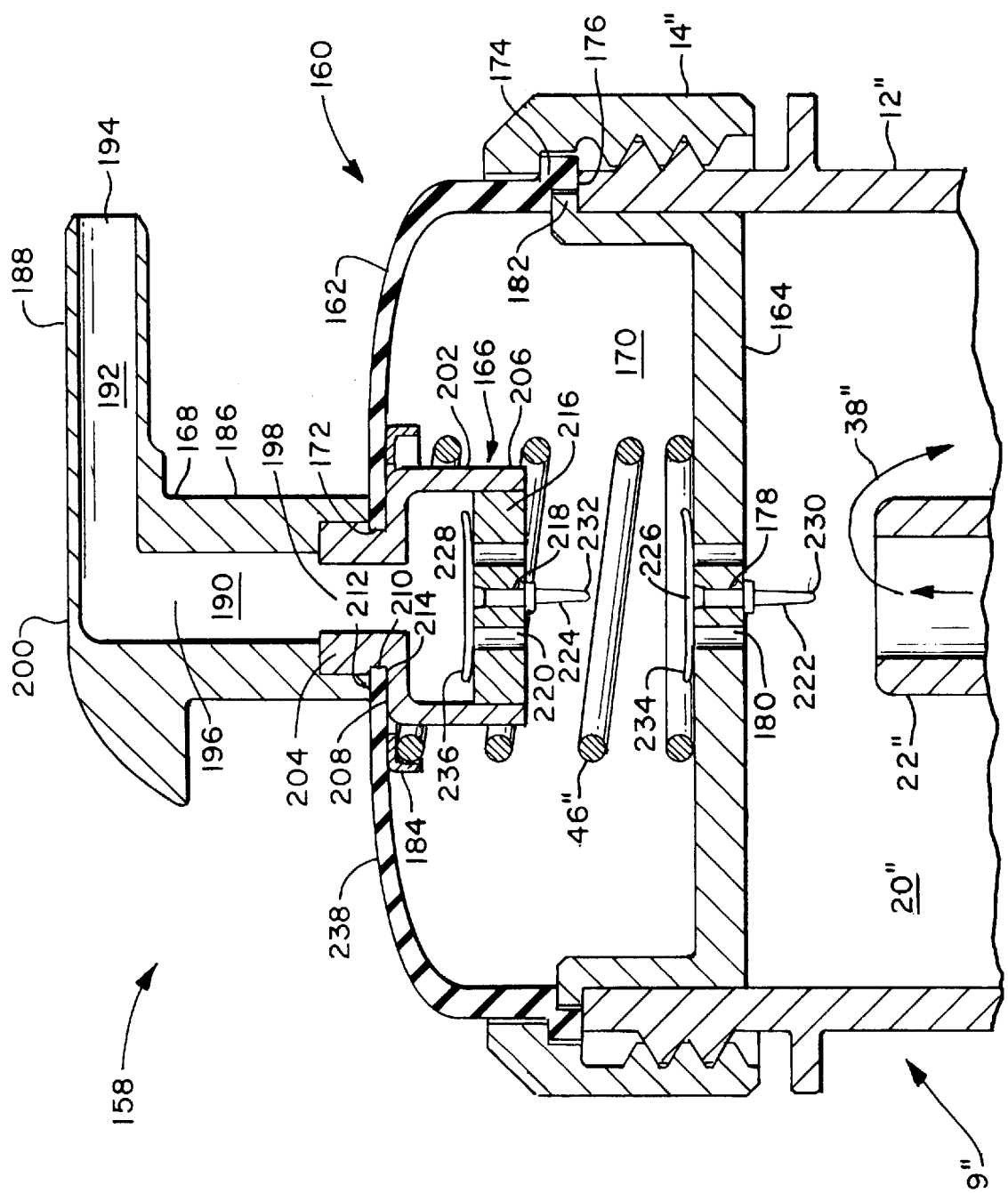
FIG. 4 is an enlarged sectional elevation view of a second embodiment of a hand primer and filter base of a fuel filter assembly in accordance with the invention.

With reference to the drawings wherein like numerals represent like parts throughout the several figures, the invention can be appreciated by a comparison of the inventive features of FIGS. 2–4 with the prior art represented in FIG. 1. FIG. 1 shows a conventional fuel filter assembly 9 having a hand primer 10 mounted to a filter base 12 via a first retaining collar 14. The filter base 12 includes a fuel exit port 16, a fuel entry port 18 and a sump 20. Additionally, the base includes a first central fuel conduit 22, which is in fluid communication with the sump 20 and the fuel exit port 16, and a second fuel conduit 24 which is in fluid communication with the fuel entry port 18. A fuel filter cartridge 26 is mounted to the base 12 via a second retaining collar 28.

The filter cartridge 26 includes a housing 30, a filter element 32, and a water drain mechanism 34. A first end wall of the housing defines an opening having a grommet seal 36 disposed thereon for sealingly engaging the exterior of the second conduit 24 when cartridge 26 and base 12 are engaged with one another. The filter element 32 is a conventional filter element of a continuous fan-shaped, pleated configuration. Thus, as fuel flows through the filter element 32, particulate matter and water suspended in the fuel are removed therefrom. The cartridge 26 is disposable and is replaced upon sufficient degradation of its filter qualities.

The filter base 12, the cartridge housing 30 and the filter element 32 cooperate to define a flow path 38 for the fuel. As shown by the flow path arrows 38 in FIG. 1, fuel delivered to the filter base arrives at the entry port 18. This fuel flows in an axial direction through the passage 40 define between the first and second conduits 22, 24. The fuel flow is then directed upward and outward to the space between the filter element 32 and the side-wall of the housing 30. The fuel then flows radially inward through the filter element 32 and into the first conduit 22 via the interior chamber 42 defined by the filter element 32.

Finally, the fuel flows out of the filter base 12 via the sump 20 and the fuel exit port 16.

The hand primer 10 includes a housing 44 that is mounted to the filter base 12. A spring 46 disposed within a diaphragm 48 biases the diaphragm 48 away from a valve plate 50 which provides a means of directing the flow of fuel into and out of the reservoir 52 formed within the housing 44 via a plurality of radially spaced orifices 54. A radially extending seating member 56 of a primer valve 58 is moveable between upper and lower positions such that the seating member 56 closes each of the orifices 54 when it is in the upper position and the orifices 54 provide fluid communication between the reservoir 52 and the sump 20 when the seating member 56 is in the lower position.

An axial bore 60 extends through the body of the primer valve 58 and a plurality of radially spaced orifices 62 extend between the upper surface of the primer valve 58 and a lower portion of the bore 60. An umbrella valve 64 is moveable between upper and lower positions such that the seating member extends over the orifices 62, preventing flow through each of the orifices 62 when the umbrella valve 64 is in the lower position. The orifices 62 are uncovered and provide fluid communication between the reservoir 52 and the lower portion of the bore 60 when the umbrella valve 64 is in the upper position.

The prior art fuel filter assembly 9 is primed by depressing a plunger 66 against the diaphragm 48 and the biasing force of the spring 46. The pressure created by depressing the diaphragm 48 pushes the seating members of the umbrella valve 64 and primer valve 58 into the lower position, closing the orifices 62 in the primer valve 58, opening the orifices 54 in the valve plate 50, and propelling fuel and any air trapped in the fuel filter assembly 9 from the reservoir 52 out of the fuel filter assembly 9 via the sump 20 and the exit port 16. The air propelled from the fuel filter assembly 9 is transported to the fuel injection pump (not shown) where it may adversely effect the operation of the pump. Releasing the plunger 66 allows the spring 46 to return the diaphragm 48 to its fully extended position, creating a suction in the reservoir 52. The suction draws the seating members of the primer valve 58 and the umbrella valve 64 to the upper positions, closing the orifices 54 in the valve plate 50 and opening the orifices 62 in the primer valve 58, respectively. The suction draws fuel from chamber 42 into the reservoir 52 via the first conduit 22.

With reference to FIGS. 2 and 3, a first embodiment of a hand primer 68 in accordance with the present invention includes a housing 44' which is mounted to a filter base 12' via a retaining collar 14'. The filter base 12' and the filter cartridge (not shown) cooperate to define a flow path 38' for the fuel in a manner similar to that of the filter assembly 9 of FIG. 1. As shown by the arrows in FIG. 2 for fuel path 38', fuel delivered to the filter base 1 2' arrives at the entry port 18'. This fuel flows in an axial direction through the passage 40' defined between the first and second conduits 22', 24' into the filter cartridge. The fuel flows through the filter element and upward through the first conduit 22' into the sump 20'. Finally, the fuel flows out of the filter base 12' via an outlet plenum 70 and the fuel exit port 16'. The fuel exit port 16' is located at a position which is lower than the upper outlet end 72 of the first conduit 22'. Consequently, the direction of fuel flow is reversed in the sump 20' from an upward flow as the fuel exits the first conduit 22' to a downward flow through the outlet plenum 70.

Hand primer 68 also includes a diaphragm 48' and a base plate 74 disposed within the housing 44'. The diaphragm 48' includes a radially extending skirt 76 that is clamped between the housing 44' and the rim 78 of the base 12' to seal the hand primer 68 to the base 12'. Preferably, the diaphragm 48' is composed of a flexible, inert material, such as nitrile, fluorocarbon or fluorosilicon. A spring 46' engages the lower surface of the diaphragm 48' and the upper surface of the base plate 74 to bias the diaphragm 48' away from the base plate 74. A spring cap 80 may be disposed intermediate the upper end of the spring 46' and the lower surface of the diaphragm 48' to distribute the biasing force over the lower surface of the diaphragm 48'. The rim 82 of the base plate 74 may be clamped between the upper rim 78 of the filter base 12' and the bottom rim of the diaphragm 48'. Alternatively, the biasing force of the spring 46' may hold the base plate 74 in position. The base 84 of a plunger 66' is disposed intermediate the upper surface of the diaphragm 48' and the end wall 86 of the housing 44'. The shaft 88 of the base 84 extends upwardly through an opening 90 in the end wall 86 of the housing 44' and is free to move reciprocally up and down within the opening 90. The stem 92 of a hand-knob 94 is mounted to the shaft 88 of the base 84. The operator pad 96 of the hand-knob 94 may be depressed to compress the diaphragm 48' against the biasing force of the spring 46'.

The base plate 74 defines a vacuum cavity 98 within the hand primer 68 which is physically separated from the fuel flow path 38' through the fuel filter assembly 9'. A peripheral portion 100 of the base plate 74 includes an opening 102 and a plurality of radially spaced orifices 104 that extend axially through the base plate 74. The stem 106 of a primer valve 108 extends through the opening 102 to a distal end portion 110 disposed within the sump 20' of the base 12'. The outside diameter of distal end portion 110 is greater than the inside diameter of the opening 102 to retain the primer valve 108 to the base plate 74. A radially extending seating member 112 of the primer valve 108 is moveable between upper and lower positions such that the seating member 112 seats along a sealing annulus to effectively close all of the orifices 104 when it is in the lower position, and the orifices 104 provide fluid communication between the sump 20' and the vacuum cavity 98 when the seating member 112 is in the upper position. Alternatively, the diameters of opening 102 and the stem 106 of the primer valve 108 may be selected such that the annulus formed between the OD of stem 106 and the ID of opening 102 provides sufficient flow. The peripheral portion 100 of the base plate 74 is positioned substantially over outlet plenum 70 to ensure that the fuel flow path 38' is not directed toward the orifices 104.

The base plate 74 includes a downwardly extending rim 114. An O-ring 116 may be mounted in a circumferential groove 118 on the cylindrical portion of the base plate rim 114 to seal the base plate 74 to the base 12'. The base plate also includes a downwardly extending outlet connector 120. The distal portion 122 of the outlet connector 120 is received within the upper portion 124 of an axially extending blind bore 126 in the filter base 12'. An O-ring 128 is clamped between the distal end portion 122 of the outlet connector 120 and the bore 126 to seal the outlet connector 120 to the base 12'. Preferably, the bore 126 has upper and lower portions 124, 130, the inside diameter of the upper portion 124 being greater than the inside diameter of the lower portion 130 to define a first shoulder 132, and the outside diameter of the upper portion 134 of the outlet connector 120 being greater than the outside diameter of the distal end portion 122 of the outlet connector 120 to define a second shoulder 136. The distal end portion 122 of the outlet connector 120 is received in the lower portion 130 of the bore 126 and O-ring 128 is clamped between the first and second shoulders 132, 136. A bore 138 connects the blind bore 126 with a discharge passageway 140. A discharge port 142 in fluid communication with the discharge passageway 140 may be connected to the fuel tank (not shown) or to atmosphere.

With additional reference to FIG. 3, a flow control plate 144 is mounted transversely across the discharge passageway 140. The flow control plate 144 includes an opening 146 and a plurality of spaced orifices 148 that extend through the flow control plate 144. The stem 150 of an umbrella valve 152 extends through the opening 146 to a distal end portion 154. The outside diameter of distal end portion 154 is greater than the inside diameter of the opening 146 to retain the umbrella valve 152 to the flow control plate 144. An outwardly extending seating member 156 of the umbrella valve 152 is moveable between open and close positions such that the seating member 156 effectively closes all of the orifices 148 when it is in the close position, and the orifices 148 provide fluid communication between the vacuum cavity 98 and the discharge port 142 when the seating member 156 is in the open position. Alternatively, the diameters of opening 146 and the stem 150 of the umbrella valve 152 may be selected such that the annulus formed between the OD of stem 150 and the ID of opening 146 provides sufficient flow. Preferably, the umbrella valve 152 is composed of a flexible, inert material, such as nitrile, fluorocarbon or fluorosilicon.

The fuel filter assembly 9' is primed by depressing the hand-knob 94, plunger 66' and diaphragm 48' against the biasing force of the spring 46'. The pressure created by depressing the diaphragm 48' pushes the seating member 112 of the primer valve 108 into the lower position, closing the orifices 104 in the base plate 74. The pressure also pushes the seating member 156 of the umbrella valve 152 into the open position, opening the orifices 148 in the flow control plate 144 and propelling fuel and any air trapped in the vacuum cavity 98 out of the fuel filter assembly 9' via blind bore 126, bore 138, the discharge passageway 140, and the discharge port 142. Releasing the plunger 66' allows the spring 46' to return the diaphragm 48' to its fully extended position, creating a suction in the vacuum cavity 98. The suction draws the seating members 112, 156 of the primer valve 108 and the umbrella valve 152 to the upper and closed positions, respectively, thereby closing the orifices 148 in the flow control plate 144 and opening the orifices 104 in the base plate 74. The suction draws air trapped in the top of the sump 20' into the vacuum cavity 98. A small amount of relatively stagnant fuel may also be drawn into the vacuum cavity 98. However, the flow path 38' of the fuel away from the orifices 104 and the relatively large suction force of the fuel injection pump compared to that of the vacuum cavity 98 ensures that there is little or no effect on the flow of fuel. Further, separating the hand primer 68 from the fuel flow path 38' prevents the hand primer 68 from pushing air into the fuel supply line between the fuel filter and the fuel injection pump.

With reference to FIG. 4, a second embodiment of a hand-primer 158 in accordance with the invention comprises a cap assembly 160. The cap assembly 160 includes a cap member 162, a base plate 164, an interiorly projecting check valve subassembly 166, and an exteriorly projecting outlet member 168. The cap member 162 is comprised of resilient elastomeric material, such as Viton™, Hytrel™, or BUNA. The cap member 162 is an inverted cup-like receptacle and defines a vacuum cavity 170 which is separated from the sump 20" of the filter base 12" by the base plate 164. The cap member 162 has an axial opening 172. A medial edge portion 174 of the cap member 162 defines an outwardly projecting lip which is clamped between the rim 176 of the filter base 12" and the retainer 14" to seal the cap assembly 160 to the filter base 12". The base plate 164 has an opening 178, a plurality of radially spaced orifices 180, and a radially projecting lip 182 which is clamped between the edge portion 174 of the cap member 162 and the rim 176 of the filter base 12". A spring 46" engages the lower surface of the cap member 162 and the upper surface of the base plate 164 to bias the cap member 162 away from the base plate 164. A spring cap 184 may be disposed intermediate the upper end of the spring 46" and the lower surface of the cap member 162 to distribute the biasing force over the lower surface of the cap member 162.

The L-shaped outlet member 168 comprises axial and radial leg portions 186, 188 that define a connecting axial and radial passages 190, 192, respectively. The radial passage 192 terminates in a discharge port 194 which may be connected to the fuel tank (not shown) or to atmosphere. Preferably, the axial leg portion 186 is substantially orthogonal to the radial leg portion 188 and the axial passage 190 is substantially orthogonal to the radial passage 192. The axial passage 190 has an upper first portion 196 and a lower second portion 198 wherein the diameter of the second portion 198 is greater than the diameter of the first portion 196. The upper surface 200 of the radial leg portion 188 has a rounded shape, facilitating use of the radial leg portion 188 as a hand operator to depress the cap member 162.

The check valve subassembly 166 comprises a stepped sleeve-like conduit 202 having an upper first section 204 and a lower second section 206. The outside diameter of the second section 206 is larger than the outside diameter of the first section 204 to define a shoulder 208. The reduced section 204 of the conduit 202 extends upward through the opening 172 and is received within the second portion 198 of axial passage 190 wherein the axial passage 190 is substantially coaxial with the cap member opening 172 and the conduit 202. The reduced section 204 of the conduit 202 may be mounted to the outlet member 168 by threaded connection, glue, or other means. The edge portion 210 of the cap member 162 surrounding the opening 172 is clamped between the shoulder 208 and the distal end 212 of the axial leg portion 186 of the outlet member 168. As shown in FIG. 4, edge portion 210 may also extend radially into a groove 214 in the first section 204 of the conduit 202.

A flow control plate 216 mounted within the second section 206 of the conduit 202 has an opening 218 and a plurality of radially spaced orifices 220. The stems 222, 224 of first and second umbrella valves 226, 228 extend through the openings 178, 218 of the base plate 164 and flow control plate 216, respectively, to a distal end portion 230, 232. The outside diameter of each distal end portion 230, 232 is greater than the inside diameter of the respective opening 178, 218 to retain the first and second umbrella valves 226, 228 to the base plate 164 and flow control plate 216. A radially extending seating member 234 of the first umbrella valve is moveable between upper and lower positions such that the seating member 234 effectively closes all of the base plate orifices 180 when it is in the lower position and the base plate orifices 180 provide fluid communication between the vacuum cavity 170 and the sump 20" of the filter base 12" when the seating member 234 is in the upper position. Similarly, a radially extending seating member 236 of the second umbrella valve 228 is moveable between upper and lower positions such that the seating member 236 effectively closes all of the flow control plate orifices 220 when it is in the lower position, and the flow control plate orifices 220 provide fluid communication between the vacuum cavity 170 and the discharge port 194 when the seating member 236 is in the upper position. Alternatively, the diameters of openings 178, 218 and stems 222, 224 of the first and second umbrella valves 226, 228 may be selected such that the annulus formed between the OD of stems 222, 224 and the ID of openings 178, 218, respectively, provide sufficient flow.

The fuel filter assembly 9" may be primed by pushing the outlet member 168 and the upper portion 238 of the cap member 162 downwardly, deforming the cap member 162. The downward force will compress the spring 46", allowing the upper portion 238 of the cap member 162 to be pushed into the vacuum cavity 170. The pressure created by depressing the cap member 162 pushes the seating member 234 of the first umbrella valve 226 into the lower position, closing the orifices 180 in the base plate 164. The pressure also pushes the seating member 236 of the second umbrella valve 228 into the upper position, opening the orifices 220 in the flow control plate 216 and propelling fuel and any air trapped in the vacuum cavity 170 out of the fuel filter assembly 9" via the conduit 202, the axial and radial passages 190, 192, and the discharge port 194. Removing the downward force will allow the spring 46" to return to its normal length, forcing the upper portion 238 of the cap member 162 upwardly. This will cause a low pressure or suction to develop in the vacuum cavity 170.

The suction draws the seating member 236 of the second umbrella valve 228 to the lower position, closing the orifices 220 in the flow control plate 216. The suction also draws the seating member 234 of the first umbrella valve 226 to the upper position, opening the orifices 180 in the base plate 164. The suction draws air trapped in the top of the sump 20" into the vacuum cavity 170. Similar to the first embodiment 68, a small amount of relatively stagnant fuel may also be drawn into the vacuum cavity 170. However, the separate flow path 38" of the fuel through the fuel filter assembly 9" and the relatively large suction force of the fuel injection pump compared to that of the vacuum cavity 170 ensures that there is little or no effect on the flow of fuel. Further, separating the hand primer 158 from the fuel flow path 38" prevents the hand primer 158 from pushing air into the fuel supply line between the fuel filter and the fuel injection pump.

It should be appreciated that a hand-primer 68, 158 in accordance with the invention will work equally as well with a fuel filter assembly having a flow path which is the reverse of that shown in FIG. 1. Because the vacuum cavity 98, 170 is effectively isolated from the base sump and the fuel flow path, and the hand-primer 68, 158 utilizes a flow path that is separate from the fuel flow path, operation of the hand primer will have no substantial adverse effect on the performance of the fuel injection pump. Further, positioning the hand-primer 68, 158 intermediate the fuel filter element and the fuel injection pump allows the suction force created by the fuel injection pump to act as a check valve to prevent reverse flow in the fuel filter assembly.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fuel filter assembly comprising:
   a filter base having a fuel inlet, a fuel outlet, a fuel sump in fluid communication with the fuel outlet, first fuel passage means in fluid communication with the fuel inlet, and second fuel passage means in fluid communication with the sump;
   a filter cartridge mounted to the filter base for filtering the flow of fuel, the filter cartridge being in fluid communication with the first and second fuel passage means to receive and discharge a flow of fuel, respectively, whereby the filter base and filter cartridge define a fuel flow path;
   a hand primer comprising a deformable member and a base plate defining a cavity, the base plate being disposed intermediate the deformable member and the sump of the base to separate the cavity from the fuel flow path, the base plate defining first communication means for providing fluid communication between the cavity and the sump, the deformable member having a compressed state when a compressive force urges the deformable member into the cavity and a static state when the compressive force is not applied to the deformable member, the hand primer further comprising a first valve movable between open and closed positions for respectively opening and closing the first communication means between the cavity and the sump; and
   discharge means for discharging air from the fuel filter assembly, the discharge means defining a discharge passage in fluid communication with cavity,
   wherein application of the compressive force to the deformable member moves the deformable member to the compressed state, creating a pressure head within the cavity, and removal of the compressive force returns the deformable member to the static state, creating a suction force within the cavity, the pressure head moving the first valve to the closed position and propelling material in the cavity through the discharge passage and the suction force moving the first valve to the open position whereby the suction force is transmitted to the sump of the base.

2. The fuel filter assembly of claim 1 further comprising check valve means disposed in the discharge passage for preventing flow into the cavity via the discharge passage.

3. The fuel filter assembly of claim 2 wherein the check valve means comprises a flow control plate mounted transverse to the discharge passage, the flow control plate defining second communication means for providing fluid communication through the flow control plate, and a second valve movable between open and closed positions for opening and closing the second communication means, wherein the pressure head moves the second valve to the open position and the suction force moves the second valve to the closed position.

4. The fuel filter assembly of claim 1 further comprising a spring engaging the deformable member and the base plate to bias the deformable member away from the base plate.

5. The fuel filter assembly of claim 1 wherein the base plate comprises a connector section axially extending into the sump of the base, the connector section having a distal end portion defining a bore, and the filter base defines first and second bores defining the discharge passage, the distal end portion of the connector section being received within the first bore of the filter base and sealingly engaged to the filter base, the bore of the connector section being in fluid communication with the discharge passage.

6. The fuel filter assembly of claim 5 further comprising check valve means disposed in the second bore of the base for preventing flow into the cavity via the discharge passage.

7. The fuel filter assembly of claim 1 wherein the deformable member defines an opening and the hand primer further comprises an outlet member extending through the opening of the deformable member, the outlet member defining the discharge passage.

8. The fuel filter assembly of claim 7 wherein the outlet member comprises an exteriorly extending hand operator portion and an inwardly extending conduit portion mounted to the hand operator portion.

9. The fuel filter assembly of claim 8 wherein the conduit portion has first and second segments each having an outside diameter, the outside diameter of the second segment being greater than the outside diameter of the first segment to define a shoulder, and the hand operator portion has a rim disposed adjacent the conduit portion, deformable member being clamped between the shoulder of the conduit portion and the rim of the hand operator portion.

10. The fuel filter assembly of claim 8 further comprising check valve means disposed in the conduit portion for preventing flow into the cavity via the discharge passage.

11. The fuel filter assembly of claim 1 wherein the second fuel passage means comprises an axial conduit having a distal end disposed in the sump of the base at an axial distance from the base plate of the hand primer and the sump comprises an outlet plenum disposed at an axial distance from the base plate of the hand primer, the distance of the outlet plenum being greater than the distance of the distal end of the conduit, wherein the fuel flows into the sump via the conduit and out of the sump via the outlet plenum, whereby the fuel flow path is axially reversed in the sump.

12. The fuel filter assembly of claim 11 wherein the base plate defines an orifice positioned substantially above the outlet plenum, the fuel flow path directing the flow of fuel away from the orifice of the base plate.

13. The fuel filter assembly of claim 1 further comprising housing means for housing the deformable member and the base plate, and plunger means for applying the compressive force to the deformable member, the housing defining an axial opening, the plunger means comprising a base disposed intermediate the housing and the deformable member, an operator pad disposed exteriorly of the housing means and a shaft extending from the base to the operator pad through the opening of the housing.

14. The fuel filter assembly of claim 13 wherein the deformable member has a surface and the hand primer further comprises biasing means for imposing a biasing force on the surface of the deformable member and distribution means disposed intermediate the biasing means and the deformable member for distributing the biasing force across the surface of the deformable member.

* * * * *